United States Patent [19]
Edin

[11] 3,783,236
[45] Jan. 1, 1974

[54] ELECTRICALLY OPERATED STEAM HEATER

[75] Inventor: Ronald E. Edin, Straham, N.H.

[73] Assignee: GTE Sylvania Incorporated, Danvers, Mass.

[22] Filed: Mar. 2, 1973

[21] Appl. No.: 337,594

[52] U.S. Cl............. 219/381, 219/374, 219/375, 219/401, 219/546, 219/553, 338/298, 338/302
[51] Int. Cl............................................. H05b 3/02
[58] Field of Search.............. 219/364, 368, 370, 219/373, 374, 375, 381, 401, 530, 535, 545, 552, 553; 338/286, 296, 298, 299, 302; 23/281, 288.8

[56] References Cited
UNITED STATES PATENTS

| | | | |
|---|---|---|---|
| 1,171,059 | 2/1916 | Loguin | 338/296 X |
| 2,957,154 | 10/1960 | Strokes | 338/299 |
| 3,094,606 | 6/1963 | Ferris | 219/375 X |
| 3,109,912 | 11/1963 | Cerulli | 219/381 |
| 3,212,486 | 10/1965 | Lorge | 219/374 X |
| 3,356,830 | 12/1967 | Schleer et al. | 219/373 |
| 3,551,643 | 12/1970 | Pricenski | 219/381 |
| 3,560,710 | 2/1971 | Fuellemann | 219/373 |
| 3,598,538 | 8/1971 | Peacock | 219/381 X |
| 3,654,431 | 4/1972 | Brooks et al. | 219/381 X |

*Primary Examiner*—Volodymyr Y. Mayewsky
*Attorney*—Norman J. O'Malley et al.

[57] ABSTRACT

An electrical heater for heating steam to a superheated temperature has a longitudinal heating element disposed within a glass or ceramic tube which, in turn, is disposed within a metal cylinder. The heating element is made of resistance wire and has a cyclical spiral shape for efficient heat transfer. Steam is introduced into one end of the metal cylinder, passes through the heater and exits from the other end as superheated steam.

3 Claims, 1 Drawing Figure

PATENTED JAN 1 1974　　　3,783,236
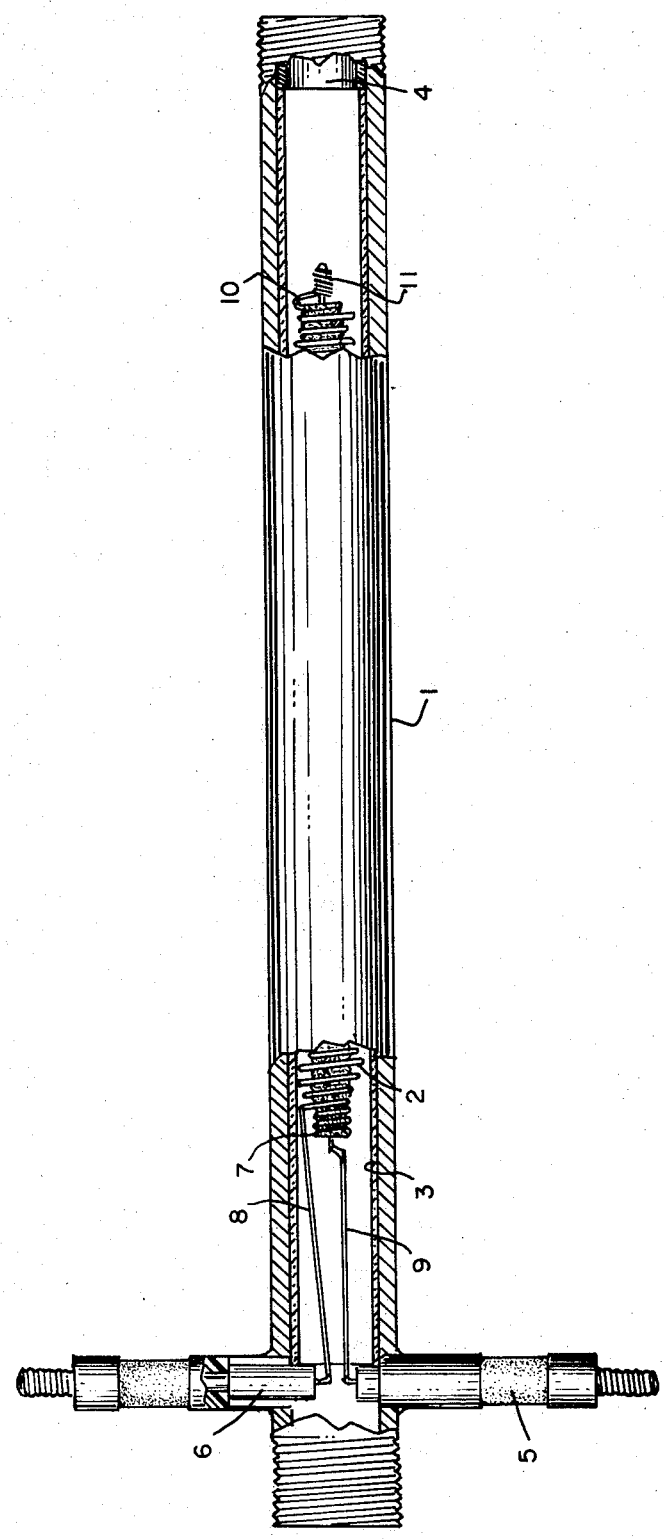

3,783,236

ELECTRICALLY OPERATED STEAM HEATER

THE INVENTION

Electrically heated steam heaters of the prior art have generally been quite bulky and have used inefficient sheathed heating elements, which prevented direct contact between the heating element and the steam.

This invention concerns a small inexpensive steam heater in which the steam passes directly through the turns of the heating element for efficient heat transfer.

The single FIGURE in the drawing is an elevational view, partly in section, of a steam heater in accordance with this invention.

Metal cylinder 1 is a container for heating element 2 and is the conduit through which the steam to be heated flows. In one example, metal cylinder 1 was a 10 inch length of half-inch stainless steel pipe, threaded at the inlet end, to permit connection to a source of steam. The outlet end could also be threaded to permit connection to apparatus utilizing the superheated steam.

Heating element 2 is a longitudinal cyclical spiral corrosion resistant wire wound element having the construction shown in U.S. Pat. Nos. 3,551,643 and 3,598,538 in order to cause turbulence in the flow of steam therethrough. In the above example, heating element 2 consisted of 125 turns of 28.5 mil kanthal wire, and had an outer diameter of 0.477 inch, an inner diameter of 0.212 inch, a total wire length of 12.1 feet, a heater body length of 6 inches and a cold resistance of 12.5 ohms.

Disposed around heating element 2 is quartz glass tube 3 which electrically insulates heating element 2 from metal cylinder 1. Heating element 2 is a slip fit into tube 3, but can have sufficient frictional engagement of the wire turns of heating element 2 with the inner wall of quartz tube 3 so that heating element 2 is not easily slidable within quartz tube 3. Tube 3, in turn, is a slip fit into metal cylinder 1. Tube 3 extends beyond both ends of heating element 2 to prevent physical contact of element 2 with cylinder 1.

Quartz tube 3 is longitudinally positioned within cylinder 1 by means of metal tubular spacer 4 which is attached, such as by welding, to cylinder 1 at the exit end thereof. Spacer 4 has about the same diameter as tube 3 and tube 3 abuts thereagainst within cylinder 1. The other end of tube 3 may abut against a similar metal tubular spacer to prevent axial movement of tube 3 within cylinder 1 or may abut against feed through insert 6. Instead of tubular spacers, other means may be used to longitudinally hold tube 3 within cylinder 1, such as pins or screws protruding through the wall of cylinder 1.

Near the inlet end of cylinder 1 are electrical connectors which provide for connection of the heater to an external source of electrical power. In the above example, the electrical connectors consisted of two ceramic and metal feed through connectors 5 fastened orthogonally to metal cylinder 1 and opposite each other. Extending through and fastened to connectors 5 are metal feed through inserts 6 to which heating element 2 is connected. Feed through inserts 6 extend slightly into the bore of cylinder 1 to act as a stop for tube 3.

Heater element 2 was mounted on threaded ceramic rod 7 which had an axial hole therethrough. The grooves of ceramic rod 7 engaged only part of each turn of heating element 2, because of the polygonal shape of the turns, but there was sufficient engagement therebetween to maintain uniform space between turns throughout the life of the heater. Ceramic rod 7 was 6 inches long, had 20 threads per inch, an outer diameter of 250 mils, a root diameter of 200 mils and a 100 mil axial hole therethrough.

The innermost end of heating element 2 was directly connected to one of the feed through inserts 6 by inserting leg 8 of element 2 directly into an axial hole in said insert and fastening it with a small screw (not shown). The other end of heating element 2 was connected to the other of said feed through inserts by means of center lead wire 9 which extended completely through the axial hole of ceramic rod 7. To provide a secure connection that lasts throughout the useful life of the heater, end 10 of heating element 2 and the end of center lead wire 9 were inserted into a small metal coil 11 and welded together.

At 110 volt operation, the heater drew 8 amperes of current and heated 212°F stem to a superheated temperature of 600°F at a rate of 120 standard cubic feet per hour.

I claim:

1. An electrically operated steam heater comprising: an elongated metal cylinder open at both ends; a longitudinal cyclical spiral corrosion resistant wire wound heating element, having an axial bore therethrough, disposed in said cylinder, the individual turns of said heating element being substantially polygonal in shape; a ceramic tube positioned within and attached to said metal cylinder encircling said heating element and electrically insulating said heating element from said metal cylinder; a ceramic rod having an axial hole therethrough disposed within the bore of said heating element said ceramic rod being externally threaded and said heating element being threaded onto said ceramic rod; two electrical connecting means attached to said metal cylinder for connecting said heater to an external source of electrical power, the end of said heating element that is more distant from said electrical connecting means being connected to one of said electrical connecting means by a wire passing through the axial hole of said ceramic rod, the other end of said heating element being directly connected to the other electrical connecting means each of said electrical connecting means comprising a ceramic and metal feed through and a metal feed through insert; two means to longitudinally position said glass tube in said metal cylinder, said feed through inserts are one of the means for longitudinally positioning said glass tube in said metal cylinder; and means to connect said heater to a source of steam.

2. The heater of claim 1 wherein another means for longitudinally positioning said glass tube in said metal cylinder is a tubular metal spacer welded to said metal cylinder.

3. The heater of claim 1 wherein said further end of said heating element and said wire passing through said ceramic rod both extend into a small metal coil where they are welded together.

* * * * *